US010897397B2

(12) United States Patent
Powell et al.

(10) Patent No.: US 10,897,397 B2
(45) Date of Patent: Jan. 19, 2021

(54) GRAMMAR FOR CONFIGURATION VALIDATION

(71) Applicant: HEWLETT PACKARD ENTERPRISE DEVELOPMENT LP, Houston, TX (US)

(72) Inventors: John A. Powell, Granite Bay, CA (US); David L. Santos, Granite Bay, CA (US); Devon L. Dawson, Rocklin, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/419,343

(22) Filed: May 22, 2019

(65) Prior Publication Data
US 2020/0374196 A1 Nov. 26, 2020

(51) Int. Cl.
*H04L 12/24* (2006.01)

(52) U.S. Cl.
CPC .................. *H04L 41/0869* (2013.01)

(58) Field of Classification Search
CPC ............... H04L 41/145; H04L 63/0428; H04L 41/0803; H04L 63/0236; H04L 63/1441; H04L 41/046; H04L 41/12; H04L 41/142; H04L 41/147; H04L 41/16; H04L 43/0817; H04L 43/50; H04L 63/0272; H04L 41/0866; H04L 41/0886; H04L 41/5054; H04L 63/0227; H04L 63/06; H04L 63/0876; H04L 63/10; H04L 63/145; H04L 63/164; H04L 63/20; H04L 63/205; H04L 65/607; H04L 67/02; H04L 9/3228; H04L 2209/805; H04L 41/0806; H04L 41/082;
(Continued)

(56) References Cited

U.S. PATENT DOCUMENTS 6,959,329 B2    10/2005  Thakor
7,219,339 B1 *   5/2007  Goyal ................... H04L 41/085
                                                        717/141
(Continued)

FOREIGN PATENT DOCUMENTS

WO    WO-2012075862    6/2012

OTHER PUBLICATIONS

Gulati, S., Validating a Set of Commands, (Web Page), Oct. 12, 2016, 13 Pgs.

*Primary Examiner* — Djenane M Bayard
(74) *Attorney, Agent, or Firm* — Nolte Intellectual Property Law Group (57) ABSTRACT

A method for network configuration validation includes identifying a target network to configure wherein the target network includes one or more switches; generating, within a network device configuration editor having a superset of configuration syntax and allowable settings values, a target network configuration for the target network; receiving a target network configuration grammar including configuration syntax and allowable settings values from the target network by interrogating the target network; limiting the superset to the received target network configuration grammar to create a limited superset; comparing the limited superset to the syntax and settings values in the target network configuration; and indicating syntax errors and settings value errors in the target network configuration.

20 Claims, 5 Drawing Sheets

(58) Field of Classification Search
CPC ....... H04L 41/22; H04L 43/045; H04L 43/08; H04L 45/28; H04L 49/1515; H04L 49/1569; H04L 51/36; H04L 51/38; H04L 63/0414; H04L 63/067; H04L 63/08; H04L 67/12; H04L 45/22; H04L 51/04; H04L 63/0485; H04L 67/10; H04L 49/25; H04L 63/1416; H04L 67/28; H04L 12/4641; H04L 67/14; H04L 12/4633; H04L 41/0213; H04L 41/022; H04L 41/0809; H04L 41/5038; H04L 43/028; H04L 49/30; H04L 49/40; H04L 51/14; H04L 51/32; H04L 51/34; H04L 63/12; H04L 63/126

See application file for complete search history.

(56) References Cited

U.S. PATENT DOCUMENTS

| | | | |
|---|---|---|---|
| 7,792,930 B1 | 9/2010 | Zhang et al. | |
| 8,321,854 B1* | 11/2012 | Zarafyants | G06F 8/427 717/112 |
| 8,782,182 B2 | 7/2014 | Chaturvedi et al. | |
| 2005/0004942 A1* | 1/2005 | Madsen | H04L 41/0853 |
| 2006/0015591 A1 | 1/2006 | Datla et al. | |
| 2019/0207974 A1* | 7/2019 | Jas | G06F 21/6227 |

\* cited by examiner

GRAMMAR FOR CONFIGURATION VALIDATION

BACKGROUND

Using routing and switching technologies allows persons with related access located in different locations to have equal access to business applications, information, and tools. Keeping everyone connected to the same tools can increase productivity. Routing and switching may also provide access to advanced applications and enable services, such as Internet protocol (IP) voice, videoconferencing and wireless networks. Connecting computers and peripherals, network switching and routing communications utilizing various network device and firmware versions may be configured utilizing syntax and settings values for available commands, settings, and operations. The configuration process may include a network device configuration editor. The syntax and settings values may be different for each target network device and device operating system.

BRIEF DESCRIPTION OF THE DRAWINGS

The present disclosure may be understood from the following detailed description when read with the accompanying Figures. In accordance with the standard practice in the industry, various features are not drawn to scale. In fact, the dimensions of the various features may be arbitrarily increased or reduced for clarity of discussion.

Some examples of the present application are described with respect to the following figures.

DETAILED DESCRIPTION

Illustrative examples of the subject matter claimed below will now be disclosed. In the interest of clarity, not all features of an actual implementation are described in this specification. It may be appreciated that in the development of any such actual example, numerous implementation-specific decisions may be made to achieve the developers' specific goals, such as compliance with system-related and business-related constraints, which will vary from one implementation to another. Moreover, it may be appreciated that such a development effort, even if complex and time-consuming, would be a routine undertaking for those of ordinary skill in the art having the benefit of this disclosure.

To configure a target network; the network device configuration editor may be used. The target network may include hardware and operating system combinations such as one or more electronic switches each including one or more of various operating system versions.

The network device configuration editor may have access to or store, in a memory, a superset of configuration commands, settings; and operating instructions that may be used to configure target network hardware and operating system combinations. The network device configuration editor may include hardware and software with a user interface for generating configuration commands, settings, and operating instructions in the form of syntax and settings values. The syntax and settings values may be sent to the target network to configure the hardware and operating system combinations. The syntax and settings values may be maintained in one or more electronic configuration files. The configuration files' contents may be transmitted to the target network to configure the hardware and operating system combinations.

For a particular target network hardware and operating system combination, the available superset of configuration commands, settings, and operating instructions may allow a user to enter configuration syntax and settings values that are not appropriate for the configuration of the particular target network hardware and operating system combination. For example, a user may enter into the network device configuration editor, configuration commands, settings, and operating instructions to configure a target network. The configuration commands, settings, and operating instructions may be selected from the superset. A first configuration file may be created containing the proposed set of configuration commands, settings, and operating instructions, in the form of a first set of configuration syntax and settings values, for the target network. The proposed first set of configuration syntax and settings values may include syntax and/or settings values errors due to typographical errors or the use of configuration syntax and settings values from the superset that are inappropriate for configuring the particular target network hardware and operating system combination. The network device configuration editor may not recognize the errors because the editor may not be aware of the specific syntax and settings values requirements for the hardware and operating system combinations in the target network. In other words, the network device configuration editor may not be device and operating system version aware.

Examples may include superset language with syntax and settings values for modules or chassis when the particular network and hardware operating system combination include stackables rather than chassis. Other examples may include the use of larger or smaller settings values that fall outside allowable settings values for the particular target network hardware and operating system combination.

The network device configuration editor utilizing the superset may not identity the associated target network configuration errors. In other words, the syntax in the configuration file or the settings values in the configuration file may be incompatible with the allowable syntax and settings values for the particular target network hardware and operating system combination and the editor would not identify that the incompatibility existed because the superset may be too generic. If the configuration information in the configuration file was sent to the particular target network with errors, the switch may reject the set of configuration syntax and settings values, requiring edits to the configuration file and the potential for a circular process that may add significant time to the configuration process.

Cloud-scale systems may use a wide variety of configuration datasets to control different features and components. These configuration datasets may be further duplicated and enlarged for different target network hardware and operating system combinations. A misconfiguration can affect an entire system. For example, misconfiguring the endpoints of load balancing components could cause all traffic to be directed to one server, not shown, overwhelming that server and effectively making the whole service unavailable. Misconfiguring the backup options of a redundant service pair, not shown, may cause the backup to be useless should the primary go down. It is not uncommon to see misconfigurations being the root cause for service disruptions, causing considerable financial cost. If there were an automated system or method that would allow the network device configuration editor to limit the allowable syntax and settings values the user could enter into the configuration file or the editor searched for within the configuration file, the network configuration may be more efficient.

The present disclosure may enable the network device configuration editor to update or limit the set of configuration commands, settings, and operating instructions available to the network device configuration editor during creation and editing of the configuration file. The configuration file contents could be checked before the configuration syntax and settings values was sent to the particular target network hardware and operating system combination, thereby increasing the efficiency of the configuration process. The present disclosure may enable the network device configuration editor to automatically generate configuration files based on the allowable syntax and settings values received from the target network. An advantage found in the current disclosure is the ability to test the contents of the file while the file is being created such that errors are flagged and can be corrected before the contents are sent to the particular target network hardware and operating system combination.

The network device configuration editor may enable the automation of multi-device network changes in workflows for service roll-outs, automated rapid network-wide changes, and policy conformance after network updates. The network device configuration editor may run as an open virtualization application virtual machine and may be resident on a local computer or server, or as a software-as-a-service capability which may be available to users via the internet or cloud computing capabilities.

The network device configuration editor may allow for continuous configuration syntax and settings values validation and may ensure that configuration changes are consistent and compliant. Validating configuration syntax and settings values for a given network and giving specific feedback based on device operating system and description information prior to sending the configuration to a network device may allow network device configuration to be more efficient. Examples may include methods and systems for providing device specific grammar for configuration validation using specific device, firmware, and/or operating system grammar and allowable settings values to check against a proposed set of configuration syntax and settings values. The methods and systems may allow an editor to build a grammar file for each specific device within a particular target network.

Accordingly, examples of the present disclosure may provide a method for network configuration validation which may include: generating, within a network device configuration editor having a superset of configuration syntax and allowable settings values, a target network configuration for a target network; receiving a target network configuration grammar including configuration syntax and allowable settings values from the target network by interrogating the target network; limiting the superset to the received target network configuration grammar to create a limited superset; comparing the limited superset to the syntax and settings values in the target network configuration; and indicating syntax errors and settings value errors in the target network configuration. In addition, examples may provide a system for network device configuration validation which may include a network device configuration editor that may be used to manipulate configuration commands; settings, and operating instructions for defining the configuration for a target network while preventing the user from entering commands and operating instructions that are incompatible with the target network. The network configuration editor may indicate errors in the configuration commands, settings, and operating instructions and suggest corrections. The target network may include one or more switches.

Figure 1:
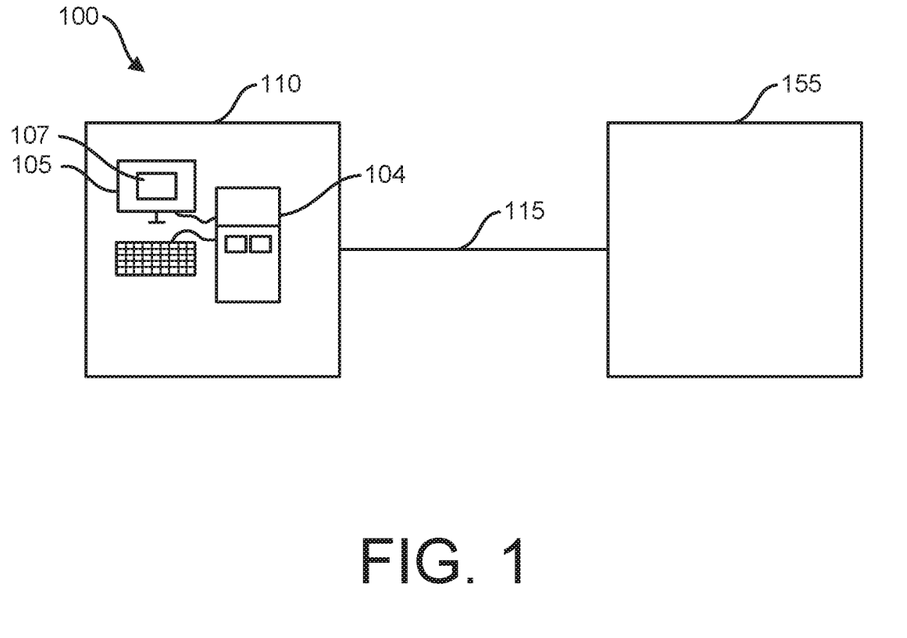
FIG. 1 is an example system for network device configuration validation, according to one or more examples disclosed.

Turning now to the drawings, FIG. 1 is an example system 100 for network device configuration validation, according to one or more examples disclosed. The system 100 may include a human interface 110 and a switch 155 to be configured. The human interface 110 may include an input device 104 and a display device 105. The input device 104 may include a computing capability and a memory capability for storing inputs. The input device 104 may provide a platform for operating a network device configuration editor 107. The display device 105 may display the network device configuration editor 107 via a graphical user interface (GUI). The network device configuration editor 107 may be used by a user to manipulate displayed configuration commands, settings, and operating instructions associated with defining a configuration for the switch 155. The human interface 110 and/or the network device configuration editor 107 may be used to send configuration commands, settings, and operating instructions over a communications link 115 to the switch 155.

The communications link 115 may be a hardline, Wi-Fi connection, fabric, any number thereof, and/or combinations thereof over which the configuration commands, settings, and operating instructions may be sent to the switch 155. The term, fabric, refers to, at least in part, to a communication network that may be used between the human interface 110 and the switch 155. The communications link 115 may use communication and transport protocols for data that may include Ethernet, Fibre Channel, Infiniband™, Gen-Z, and the like.

The Ethernet communication and transport protocol for data may operate within a physical layer and a data link layer on an open systems interconnection network protocol model. The Ethernet communication and transport protocol may include two units of transmission, a packet and a frame. The frame may include the payload of data being transmitted as well as the physical media access control (MAC) addresses of both the sender and receiver, virtual local area network (ULAN) tagging, quality of service information, and error correction information. Each packet may include a frame and additional information to establish a connection and mark where the frame starts. The Fibre Channel communication and transport protocol may include data link layer switching technologies where hardware may handle the entire protocol in a Fibre Channel fabric. The Infiniband communication and transport protocol may include a switch-based serial point-to-point interconnect architecture where data may be transmitted in packets that form a message. The Infiniband communication and transport protocol may include remote direct memory access support, simultaneous peer-to-peer communication, and end-to-end flow control. The Gen-Z communication and transport protocol may be an open-systems interconnect that may provide memory semantic access to data and devices via direct-attached, switched, or fabric topologies. The Gen-Z communication and transport protocol may enable any type and mix of dynamic random-access memory (DRAM) and non-volatile memory to be directly accessed by applications or through block-semantic communications.

The switch 155 may be physical hardware, a simulation thereof, or combinations thereof. The switch 155 may be any network switch, switching hub, bridging hub, or MAC bridge that may connect devices on a computer network by using packet switching to receive, process, and forward data to a destination device. The switch 155 may be a multiport network bridge that uses hardware addresses to process and forward data at the data link layer (layer 2) of the open systems interconnection (OSI) model. The switch 155 may be a multilayer switch that may process data at the network layer (layer 3) by incorporating routing functionality.

Figure 2:
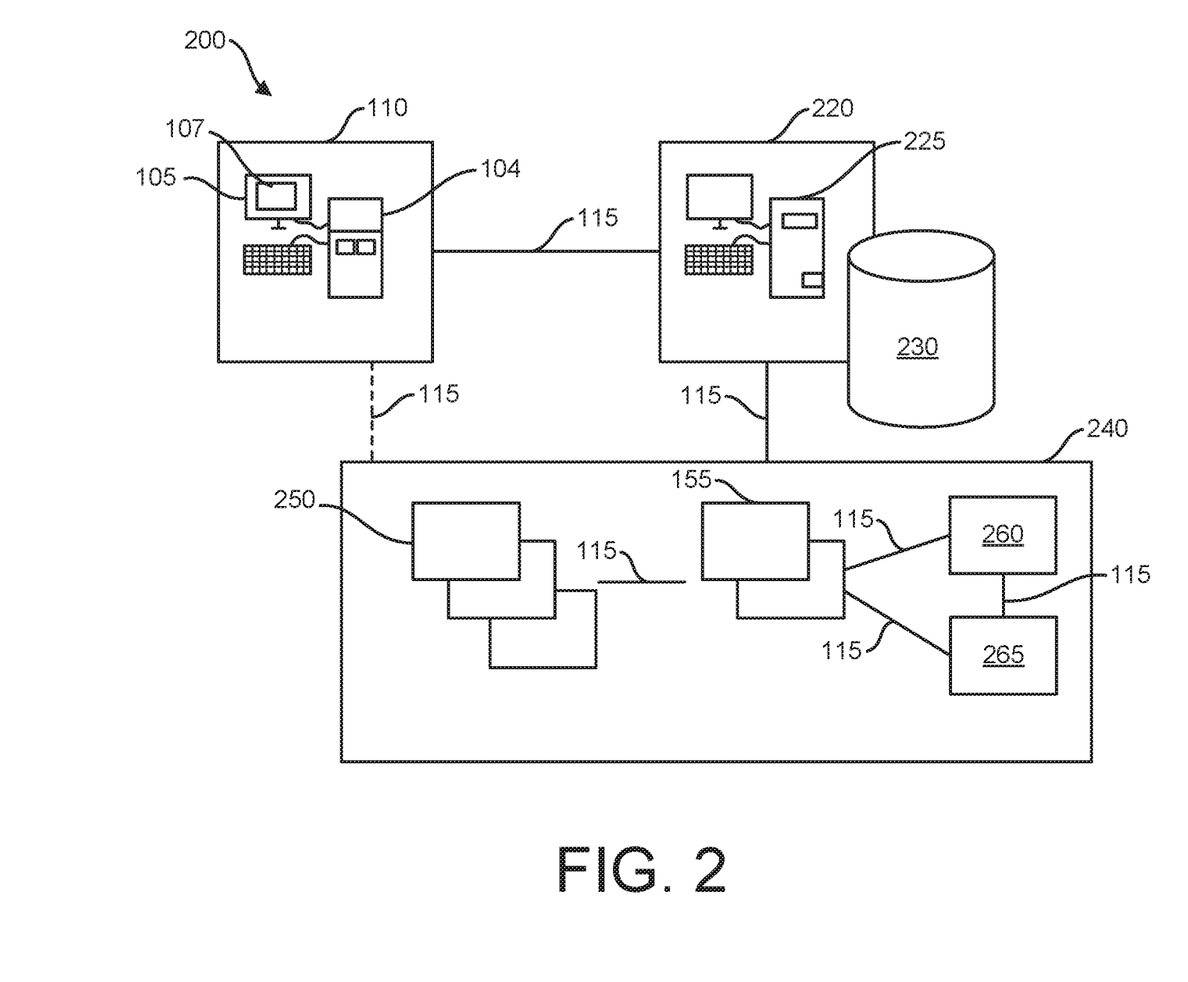
FIG. 2 is an example system for network device configuration validation, according to one or more examples disclosed.

FIG. 2 is an example system 200 for network device configuration validation, according to one or more examples disclosed. The system 200 may include a target network 240. The human interface 110 may be used to send configuration commands, settings, and operating instructions over the communications link 115 to the network 240. The human interface 110 may send configuration commands, settings, and operating instructions over the communications link 115 to the target network 240 via an external system 220 such as an external communications system which may include cloud-based computing and storage, software-as-a service utilities which may include cloud-based computing and storage, or the like. The external system 220 may include a computing capability 225 and a database 230. The network device configuration editor 107 may be used by the user to manipulate displayed configuration commands, settings, and operating instructions associated with defining the configuration for the target network 240. The network device configuration editor 107 may be provided to the human interface 110 by the external system 220 and data received by the network device configuration editor 107 may be electronically saved on the database 230 for retrieval.

The target network 240 may include one or more electronic boxes and may include physical hardware, simulated hardware, or combinations thereof. The target network 240 may include one or more routers 250, one or more switches 155, one or more computers 260, and/or one or more peripherals 265. Each router 250 may be a networking device that forwards data packets between computer networks. Each router 250 may perform the traffic directing functions between the target network 240, the human interface 110, and/or the Internet and may utilize the communications link 115 for data transport. For example, each router 250 may be connected to two or more communications links 115. When a data packet arrives at the router 250, the router 250 may read the network address information in the packet to determine the ultimate destination. Using information in a routing table or routing policy, the router 250 may direct the packet to an appropriate destination via the communications link 115. Examples may include cable or DSL routers, enterprise routers, and/or core routers. Each router 115 may be a hardware device, a software-based router, or combinations thereof.

The network device configuration editor 107 may include a superset of configuration commands, settings, and operating instructions for configuring at least one of the one or more routers 250 and/or the one or more switches 155. The network device configuration editor 107 may allow a user to create or generate a target network configuration for the target network 240, by generating a set of configuration commands, settings, and operating instructions for at least one of the one or more routers 250 and/or one or more switches 155 to define the target network configuration for the target network 240. The set of configuration commands, settings, and operating instructions may be limited to and may include device specific grammar including configuration syntax and allowable settings values based on the particular routers 250 and/or the switches 155 in the target network 240. The device specific grammar may be a function of the particular operating system running on each router 250 or on each switch 155. The specific grammar required to define the configuration for each router 250 or switch 155 within the target network 240 may be available from the manufacturer of the routers 250 or the switches 155. The specific grammar required to define the configuration for each router 250 or switch 155 within the target network 240 may be determined upon a request to or by interrogating each router 250 and/or each switch 155 within the target network 240 and receiving the specific grammar from each router 250 and/or each switch 155. Interrogating each router 250 and/or each switch 155 may include sending an electronic request for the specific grammar to each router 250 and/or each switch 155 in the target network 240. The specific grammar for each router 250 and/or each switch 155 may be the configuration syntax and allowable settings values each particular electronic box expects and/or will accept for defining the configuration for the particular router 250 and/or the particular switch 155, The network device configuration editor 107 may electronically interrogate each router 250 and/or each switch 155 within the target network 240 to receive the specific grammar from each router 250 and/or each switch 155, The specific grammar from each router 250 and/or each switch 155 may be electronically saved for later retrieval. The electronically saved grammar may be consolidated with the superset into a database, resident on the human interface 110 or the database 230, to create an updated superset.

During and/or after the user creates the target network configuration, the network device configuration editor 107 may validate the target network configuration by limiting the superset to the received target network configuration grammar to create a limited superset and comparing the grammar, the configuration syntax and the allowable settings values, from the limited superset to the syntax and settings values in the target network configuration and may indicate syntax errors and settings value errors found during the comparison, During the creation of the target network configuration, the network device configuration editor 107 may limit the grammar the user may enter into the configuration based on the limited superset. For example, the user may create a target network configuration file. While creating the target network configuration file, the user would only be able to choose from syntax that is available for configuring the target network 240 based on the limited superset. While creating the target network configuration file, the user may enter instructions for setting an operational mode for a particular switch 155. If the syntax of the instruction does not match any of the available syntax for the particular switch 155, the network device configuration editor 107 may indicate that the instruction, as written, is not correct by highlighting the instruction within the file. The highlighting may include underlining, bolding, changing color, or otherwise differentiating the incorrect instruction from other text within the file. The network device configuration editor 107 may provide suggested replacements for the incorrect instruction through the use of a popup or other visual device. The user may substitute a correct instruction that would be compatible with the syntax of the particular switch 155 by changing the text or selecting from the suggested replacements.

In other examples, while creating the target network configuration file, the user may enter a command to define the number of spare sectors to reserve in a formatted flash memory where the allowable settings values are from 0 to 16 but the user enters the number 18. The network device configuration editor 107 may indicate that the number, as written, is outside the allowable settings values for that particular command by highlighting the number within the file. The highlighting may include underlining, bolding, changing color, or otherwise differentiating the incorrect instruction from other text within the file. The network device configuration editor 107 may suggest an allowable or expected settings values, 0 to 16, through the use of a popup or other visual device. The user may change the text to an allowable settings value or select the allowable settings value from the suggested settings value provided by the network device configuration editor 107.

The allowable settings values may be a combination of letters and numbers. For example, the allowable settings values for a particular command may include a set of allowable settings values that must be entered into the particular command. A particular set of allowable settings values may include: "disk0, disk1, bootflash, slot0, sup-slot0, sup-bootflash, usb[0-1], or the like." In an example where the user enters a settings value outside the expected set of allowable settings values, the user may enter a value of "disk2" in the target network configuration and the network device configuration editor 107 may indicate that the value, as written, is outside the allowable settings values for the particular command by highlighting the value "disk2" within the file. The network device configuration editor 107 may suggest a replacement by providing the set of allowable settings values, "disk0, disk1, bootflash, slot0, sup-slot0, sup-bootflash, usb[0-1]" in a popup or other visual device. The user may change the text to one of the allowable settings values or select, from the popup or other visual device, one of the allowable settings values from the set of suggested allowable settings values provided by the network device configuration editor 107.

The user may complete the target network configuration file and have the network device configuration editor 107 perform the comparisons on the completed target network configuration file. The user may correct all of the errors found during the comparison. Advantageously, all of the corrections to the target network configuration file may be made prior to sending the target network configuration file to the target network 240, increasing the efficiency by which the target network 240 may be configured.

In one or more examples, the target network 240 may only exist within a set of requirements or a plan. Information, which may include operating system descriptions and hardware descriptions, about the specific routers 250 and/or switches 155 that make up the target network 240 may be electronically entered into the network device configuration editor 107 by the user. The user may create a target network configuration within the network device configuration editor 107. The network device configuration editor 107 may interrogate the master grammar database to determine if any subsets of the master grammar database corresponds to the specific grammar for each router 250 and/or each switch 155 entered by the user. If a grammar subset of the master grammar database corresponds to the grammar of at least one of the routers 250 and/or at least one of the switches 155 entered by the user, the network device configuration editor 107 may perform the grammar comparison and indicate grammar errors to the user for each router 250 and/or each switch 155. In one or more examples, the target network 240 may include physical hardware and plans to add one or more additional routers 250 and/or switches 155. The network device configuration editor 107 may interrogate the physical hardware within the target network 240 and the master grammar database to perform the grammar comparison for the target network configuration.

Figure 3:
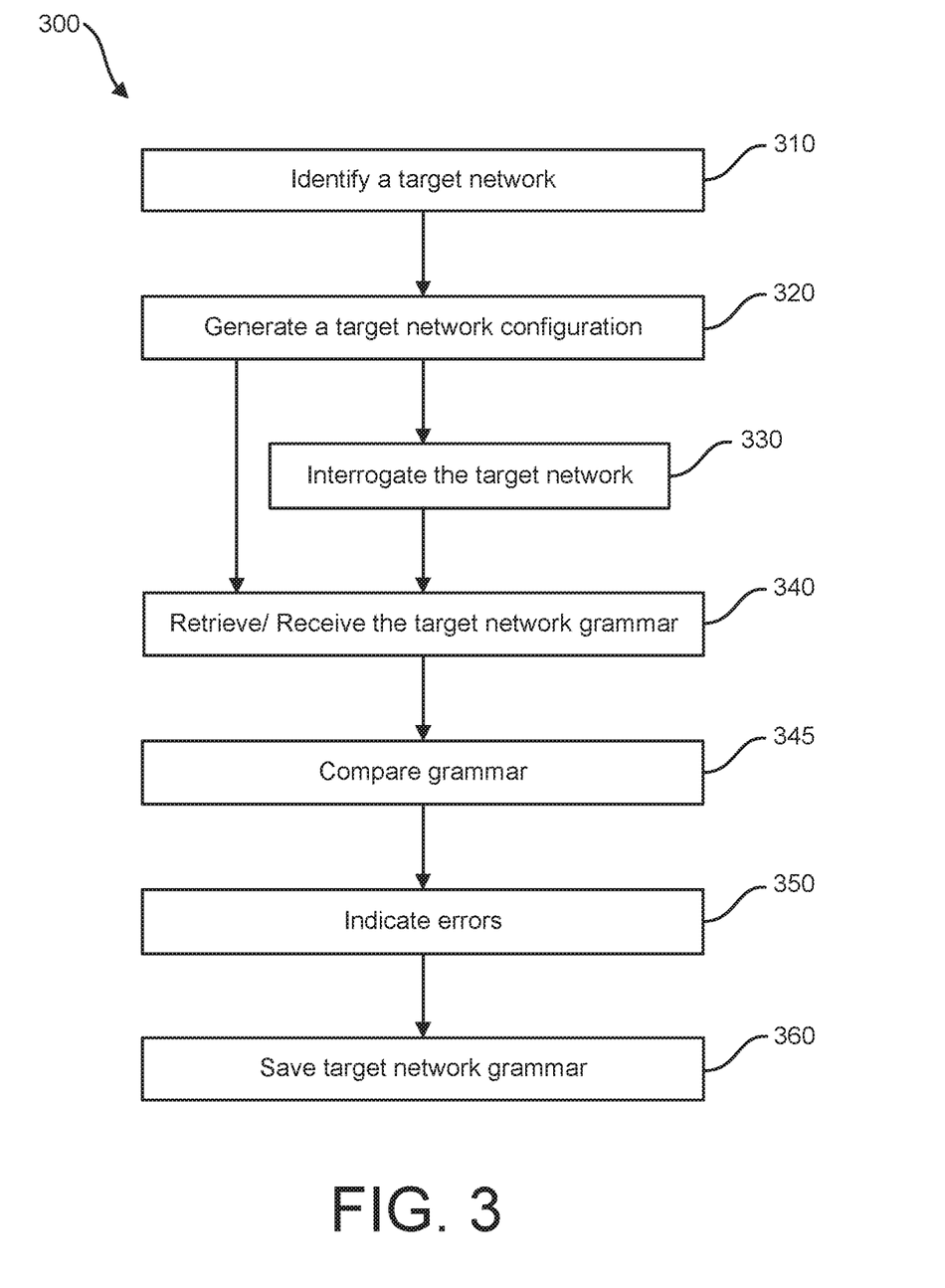
FIG. 3 is a flow chart depicting a method for network device configuration validation, according to one or more examples disclosed.

FIG. 3 is a flow chart depicting a method 300 for network device configuration validation, according to one or more examples disclosed. The method 300 may include identifying (block 310) a target network to configure; generating (block 320) a target network configuration for the target network; determining the target network configuration grammar by retrieving and/or receiving (block 340) the target network configuration grammar from the target network; comparing (block 345) the target network configuration grammar to the grammar in the target network configuration; and indicating (block 350) grammar errors in the target network configuration file. The method 300 may include interrogating (block 330) the target network and saving (block 360) the target network configuration grammar.

In examples, with reference to FIG. 2 and FIG. 3, the user may identify (block 310) the electronic location of the one or more switches 155 within the target network 240 and provide the electronic location information to the network device configuration editor 107. The electronic location information may include internet protocol addresses, port numbers, or other electronic location information. The user may generate (block 320) the target network configuration. The network device configuration editor 107 may interrogate (block 330) the target network 240 by sending a command to each of the one or more switches 155 in the target network to request switch specific grammar from each switch within the target network 240 to send the target network configuration grammar. The network device configuration editor 107 may receive (block 340) the target network configuration grammar from the one or more switches 155. While the user is generating the target network configuration or after completing the network configuration, the network device configuration editor 107 may compare (block 345) the target network configuration grammar to the target network configuration. For example, the network device configuration editor 107 may compare (block 345) the target network configuration grammar, the configuration syntax and the allowable settings values, received (block 340) from the target network to the syntax and settings values in the target network configuration while the target network configuration is being created. The network device configuration editor 107 may indicate (block 350) syntax errors and settings value errors found during the comparison. For example, the network device configuration editor 107 may indicate (block 350) that the syntax and/or settings values, as written, are not correct by visually highlighting the errors. The network device configuration editor 107 may provide suggested replacements for the incorrect syntax and/or settings values through the use of a popup or other visual device. The user may substitute corrected syntax and/or settings values compatible by changing the text or selecting from the suggested replacements. The target network configuration grammar may be saved (block 360) for later retrieval by the network device configuration editor 107.

The user may identify (block 310) one or more switches 155 that may be added to the target network 240 in the future to perform a hardware in the loop network device configuration validation. In examples, at a first moment in time, a first switch 155 may be physical hardware resident within a first target network 240. At a future time, a second switch 155 may be added to the first target network 240. To prepare for the addition of the second switch 155, the user may identify (block 310) the first switch 155 by providing location information to the network device configuration editor 107 and may identify (block 310) the second switch 155 by providing operating system information and electronic box description information to the network device configuration editor 107. The master grammar database, that may include grammar from various electronic boxes saved in a memory for later retrieval by the network device configuration editor 107, may be utilized. The network device configuration editor 107 may interrogate (block 330) the first switch 155 to request the first switch grammar and may interrogate (block 330) the second switch 155 by interrogating the master grammar database to request the second switch grammar. Interrogating (block 330) the master grammar database may include searching the master grammar database for configuration syntax and allowable settings values associated with the operating system information and electronic box description information of the second switch.

The user may generate (block 320) a target network configuration including commands, settings, and operating instructions for the first and second switch 155. While generating the target network configuration or afterward, the network device configuration editor 107 may compare (block 345) the first and second switch grammar, the configuration syntax and the allowable settings values, retrieved/received from the target network (block 340) to the syntax and settings values in the target network configuration while the target network configuration is being created. The network device configuration editor 107 may indicate (block 350) syntax errors and settings value errors found during the comparison. For example, the network device configuration editor 107 may indicate (block 350) that the syntax and/or settings values, as written, are not correct by visually highlighting the errors. The network device configuration editor 107 may provide suggested replacements for the incorrect syntax and/or settings values through the use of a popup or other visual device. The user may substitute corrected syntax and/or settings values by changing the text or selecting from the suggested replacements. The first switch grammar may be saved (block 360) for later retrieval by the network device configuration editor 107.

Figure 4:
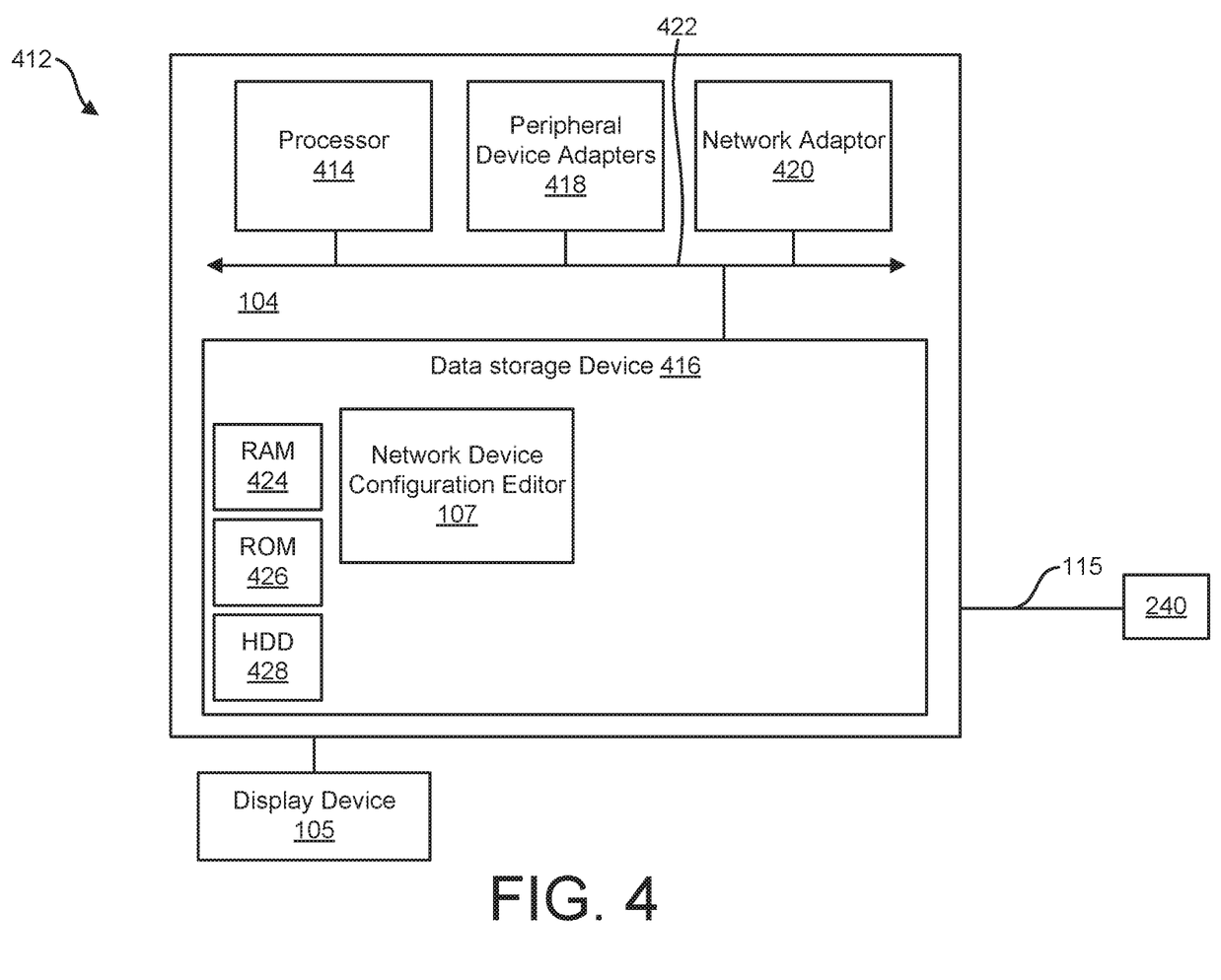
FIG. 4 is a computing system for network device configuration validation, according to one or more examples disclosed.

FIG. 4 is a computing system 412 for network device configuration validation, according to one or more examples disclosed. The input device 104 may include the computing system 412. The computing system 412 may be implemented in an electronic device. Examples of electronic devices include servers, desktop computers, laptop computers, cloud-based computers, personal digital assistants (PDAs), mobile devices, smartphones, gaming systems, and tablets, among other electronic devices. The network device configuration editor 107 may be software that can run on the computing system.

The computing system 412 may be utilized in any data processing scenario including, stand-alone hardware, mobile applications, through a computing network, or combinations thereof. Further, the computing system 412 may be used in a computing network, a public cloud network, a private cloud network, a hybrid cloud network, the communications link 115, other forms of networks, or combinations thereof. In one example, the methods provided by the computing system 412 are provided as a software as a service over the communications link 115 by, for example, a third party.

To achieve its desired functionality, the computing system 412 includes various hardware components. Among these hardware components may be a number of processors 414, a number of data storage devices 416, a number of peripheral device adapters 418, and a number of network adapters 420. These hardware components may be interconnected through the use of a number of busses and/or network connections. In one example, the processor 414, data storage device or tangible, non-transitory computer readable medium 416, peripheral device adapters 418, and a network adapter 420 may be communicatively coupled via a bus 422.

The processor 414 may include the hardware architecture to retrieve executable code from the data storage device 416 and execute the executable code. The executable code may, when executed by the processor 414, cause the processor 414 to implement at least the functionality of interrogating the target network 240, receiving the target network configuration grammar, limiting the superset to the received target network grammar, comparing the limited superset to the grammar found in the target network configuration file, indicating grammar errors found in the target network configuration file, suggesting corrections for the errors (block 518), as well as other functionality. For example, the executable code may, when executed by the processor 414, cause the processor 414 to communicate with the target network by addressing at least one switch 155 in the target network 240 and then interrogate the target network. The functionality of the computing system 412 is in accordance with the methods of the present specification described herein. In the course of executing code, the processor 414 may receive input from and provide output to a number of the remaining hardware units.

The data storage device 416 may store data such as executable program code that is executed by the processor 414 or other processing device. The processor 414 may be a central processing unit that is to execute an operating system in the computing system 412. As will be discussed, the data storage device 416 may specifically store computer code representing a number of applications that the processor 414 executes to implement at least the functionality described herein.

The data storage device 416 may include various types of memory modules, including volatile and nonvolatile memory. For example, the data storage device 416 of the present example includes Random Access Memory (RAM) 424, Read Only Memory (ROM) 426, and Hard Disk Drive (HDD) memory 428. Many other types of memory may also be utilized, and the present specification contemplates the use of many varying type(s) of memory in the data storage device 416 as may suit a particular application of the principles described herein. In certain examples, different types of memory in the data storage device 416 may be used for different data storage functions. For example, in certain examples the processor 414 may boot from Read Only Memory (ROM) 426, maintain nonvolatile storage in the Hard Disk Drive (HDD) memory 428, and execute program code stored in Random Access Memory (RAM) 424.

The data storage device 416 may include a computer readable medium, a computer readable storage medium, or a non-transitory computer readable medium, among others. For example, the data storage device 416 may be, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain or store a program for use by or in connection with an instruction execution system, apparatus, or device.

The hardware adapters 418, 420 in the computing system 412 enable the processor 414 to interface with various other hardware elements, external and internal to the computing system 412. For example, the peripheral device adapters 418 may provide an interface to input/output devices, such as, for example, display device 105, a mouse, or a keyboard. The peripheral device adapters 418 may also provide access to other external devices such as an external storage device, a number of network devices such as, for example, servers, switches, and routers, client devices, other types of computing devices, and combinations thereof.

The display device 105 may be provided to allow a user of the computing system 412 to interact with and implement the functionality of the computing system 412. The peripheral device adapters 418 may also create an interface between the processor 414 and the display device 105, a printer, or other media output devices. The network adapter 420 may provide an interface to other computing devices within, for example, a network, thereby enabling the transmission of data between the computing system 412 and other devices located within the network. The network adapter 420 may provide an interface to an external telecommunications network such as a cellular phone network, the communications link 115, or other external networks, thereby enabling the transmission of data between the computing system 412 and other external devices such as an external storage device, a number of network devices such as, for example, servers, switches, and routers, client servers, radio frequency enabled devices, other client devices, other types of computing devices, and combinations thereof.

The computing system 412 may, when executed by the processor 414, display the number of graphical user interfaces (GUIs) on the display device 105 associated with the executable program code representing the number of applications stored on the data storage device 416. The GUIs may display, for example, interactive screenshots that allow a user to interact with the computing system 412 to input commands in association with the target network 240 commanding in association with the network device configuration editor 107 (FIG. 2) as will be described in more detail below. Examples of display devices 105 may include a computer screen, a laptop screen, a mobile device screen, a personal digital assistant (PDA) screen, and a tablet screen, among other display devices 105.

The computing system 412 may further include the network device configuration editor 107. As will be described in more detail below, the network device configuration editor 107 may include the necessary software and hardware, including the tangible, non-transitory computer readable medium, for receiving and processing information from, storing information, commanding, sending information to, sending messages to, and querying the target network 240. The network device configuration editor 107 may be used in a number of applications. For example, the network device configuration editor 107 may be used to determine the grammar for defining the configuration for the physical hardware, simulated hardware, or combinations thereof in the target network 240. The network device configuration editor 107 may compare the grammar for defining the configuration for the physical hardware, simulated hardware, or combinations thereof in the target network 240 to the grammar of the configuration file (not shown). The network device configuration editor 107 may, in near real time while being created or after completion, indicate any syntax or allowable settings value errors found in the configuration file.

Although the network device configuration editor 107 is depicted as being internal to the data storage device 416, in another example, the network device configuration editor 107 may be a peripheral device coupled to the computing system 412 or included within a peripheral device coupled to the computing system 412. Although the network device configuration editor 107 is depicted as a separate module, it may be integrated with many other modules within the human interface 110.

The computing system 412 may further includes a number of modules used in the implementation of the systems and methods described herein. The various modules within the computing system 412 include executable program code that may be executed separately. In this example, the various modules may be stored as separate computer program products. In another example, the various modules within the computing system 412 may be combined within a number of computer program products; each computer program product including a number of the modules.

Figure 5:
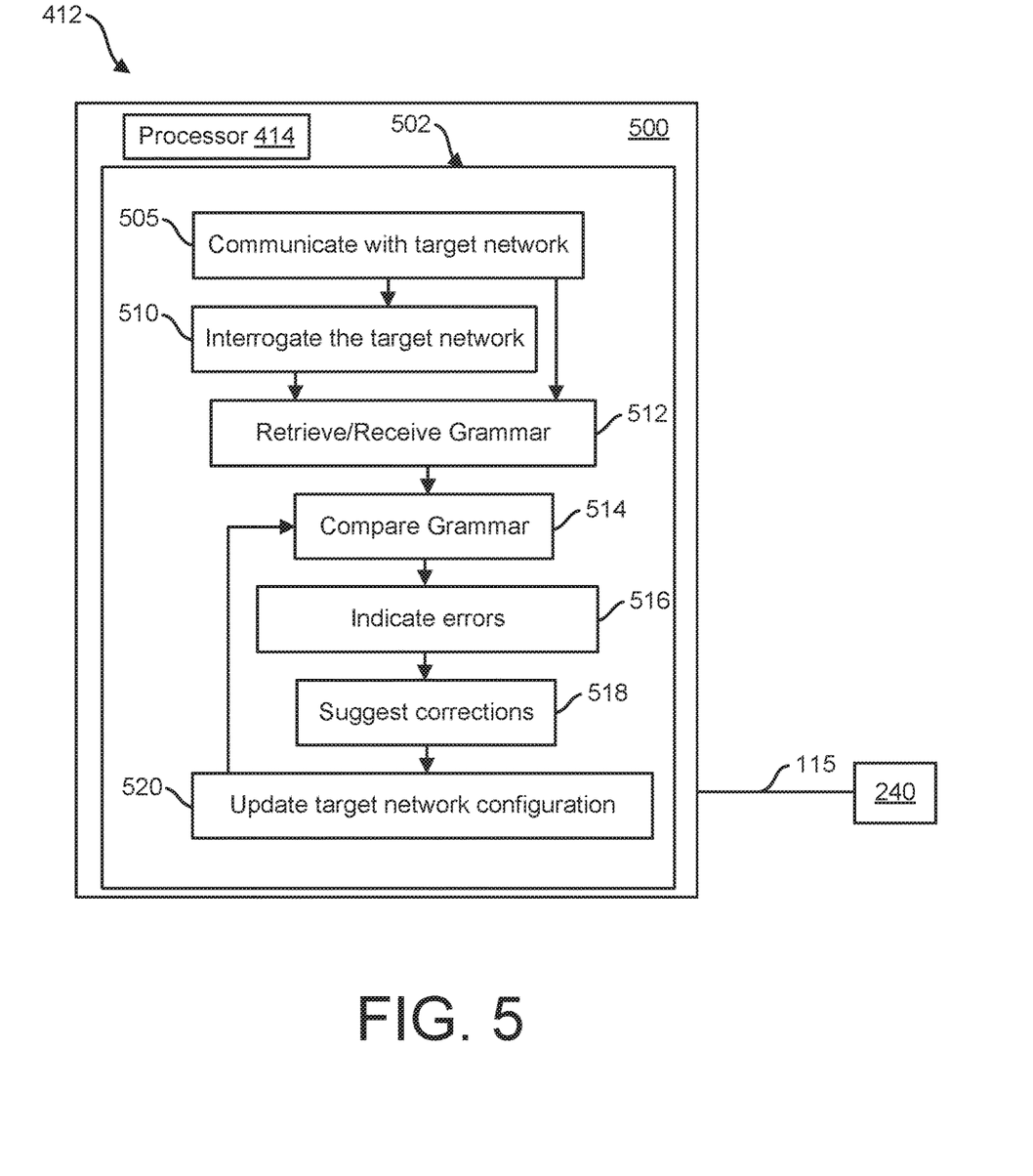
FIG. 5 is the computing system of FIG. 4 including a non-transitory computer-readable medium with computer executable instructions stored thereon, according to one or more examples disclosed.

FIG. 5 is the computing system of FIG. 4 including a non-transitory computer-readable medium 502 with computer executable instructions 500 stored thereon, according to one or more examples disclosed. When the computer executable instructions 500 are executed by the one or more processors 414, the computer executable instructions 500 may cause the one or more processors 414 to receive the target network identity information and communicate (block 505) with the target network 240 by setting up communications over the communications link 115, interrogate (block 510) the target network 240, and receive (block 512) the target network configuration grammar from the target network 240, as well as other functionality. For example, when the computer executable instructions 500 are executed by the one or more processors 414, the computer executable instructions 500 may cause the one or more processors 414 to implement at least the functionality of interrogating (block 510) the target network 240, receiving (block 512) the target network configuration grammar, and comparing (block 514) the grammar of the network configuration file to the grammar of the target network 240.

When the computer executable instructions 500 are executed by the one or more processors 414, the computer executable instructions 500 may cause the one or more processors 414 to indicate (block 516) any differences between the target network configuration file and the target network configuration grammar, suggest (block 518) corrections, and update (block 520) the target network configuration based on inputs form the user. The computer executable instructions 500 may cause the one or more processors 414 to perform comparisons (block 514) after the target network configuration is updated (block 520).

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below,

What is claimed is:

1. A method for network configuration validation, comprising:
   identifying a target network to configure wherein the target network comprises one or more switches;
   generating, within a network device configuration editor having a superset of configuration syntax and allowable settings values, a target network configuration for the target network, wherein the superset comprises configuration syntax and allowable settings values for a plurality of hardware and operating system combinations;
   receiving, from a target network, configuration grammar comprising configuration syntax and allowable settings values that are specific to a particular hardware and operating system combination in the target network;
   limiting the superset to the received target network configuration grammar to create a limited superset, wherein the limited superset comprises configuration syntax and allowable settings values that are specific to the particular hardware and operating system combination in the target network;
   comparing the limited superset to the syntax and settings values in the generated target network configuration; and
   indicating syntax errors and settings value errors in the generated target network configuration.

2. The method of claim 1, further comprising suggesting replacement syntax for correcting the indicated syntax errors and/or the indicated settings value errors.

3. The method of claim 1, further comprising limiting configuration syntax available to generate the target network configuration for the target network to the configuration syntax found in the limited superset.

4. The method of claim 1, wherein:
   receiving, from the target network, the configuration grammar comprises interrogating the target network; and
   interrogating the target network comprises sending a command to each of the one or more switches in the target network and receiving a response from each switch, the response containing the configuration syntax and allowable settings values for each switch.

5. The method of claim 1, wherein:
   the target network comprises one or more electronic boxes;
   the target network configuration comprises syntax and settings values for defining a configuration for the one or more electronic boxes in the target network; and
   receiving the target network configuration grammar comprises interrogating the one or more electronic boxes in the target network and receiving specific grammar from each of the one or more electronic boxes interrogated to create the target network configuration grammar.

6. The method of claim 5, further comprising:
   creating a target network configuration grammar file from the specific grammar received from a respective electronic box interrogated;
   associating the specific grammar with the respective electronic box; and
   saving the target network configuration grammar file.

7. The method of claim 5, wherein interrogating the one or more electronic boxes in the target network comprises sending a command to each of the one or more electronic boxes and receiving a response containing the specific configuration syntax and allowable settings values from each of the one or more electronic boxes.

8. The method of claim 5, wherein the target network comprises a switch and receiving the target network configuration grammar comprises interrogating the switch.

9. The method of claim 5, further comprising:
   receiving operating system information and electronic box description information from each of the one or more electronic boxes; and
   associating the specific grammar for each of the one or more electronic boxes interrogated with the corresponding operating system information and electronic box description information.

10. The method of claim 9, further comprising saving, within a memory, the specific grammar in association with the corresponding operating system information and electronic box description information.

11. A system comprising:
    a processor; and
    a memory that stores instructions that cause the processor to:
    receive a switch specific grammar comprising a first switch specific configuration syntax and allowable settings values for a first switch in a target network by interrogating the first switch, wherein the first switch specific configuration syntax and allowable settings values are specific to a particular hardware and operating system combination of the first switch;
    receive, within a network device configuration editor having a superset of configuration syntax and allowable settings values, syntax and settings values for defining a first configuration for the first switch in the target network, wherein the superset comprises configuration syntax and allowable settings values for a plurality of hardware and operating system combinations;
    limit the superset to the first switch specific configuration syntax and allowable settings values for the first switch to create a limited superset, wherein the limited superset comprises configuration syntax and allowable settings values that are specific to the particular hardware and operating system combination of the first switch;
    compare the limited superset to the received syntax and settings values for defining the first configuration for the first switch; and
    indicate syntax errors and settings value errors in the received syntax and settings values for defining the first configuration for the first switch.

12. The system of claim 11, wherein the instructions further cause the processor to suggest replacement syntax for correcting the indicated syntax errors.

13. The system of claim 11, wherein the instructions further cause the processor to suggest replacement allowable settings values for correcting the indicated settings value errors.

14. The system of claim 11, wherein the instructions further cause the processor to:
- determine an operating system information and a switch description information from the first switch;
- associate the operating system information and the switch description information with the first switch specific grammar; and
- save the association in the memory.

15. The system of claim 14, wherein the instructions cause the processor to:
- receive a switch specific grammar comprising a second switch specific configuration syntax and allowable settings values for a second switch in the target network by interrogating the second switch;
- receive, within the network device configuration editor, syntax and settings values for defining a first configuration for the second switch in the target network;
- compare the second switch specific configuration syntax and allowable settings values to the syntax and settings values for defining the first configuration for the second switch; and
- indicate syntax errors and settings value errors in the syntax and settings values for defining the first configuration for the second switch.

16. The system of claim 15, wherein the instructions cause the processor to:
- determine an operating system information and a switch description information from the second switch;
- associate the operating system information and the switch description information with the second switch specific grammar; and
- save the association in the memory.

17. The system of claim 11, wherein the instructions further cause the processor to transmit a set of syntax and settings values to the first switch in the target network to define the first configuration for the first switch.

18. A non-transitory, computer-readable medium storing computer-executable instructions, which when executed, cause a computer to:
- receive a switch specific grammar comprising a first switch specific configuration syntax and allowable settings values for a first switch in a target network by interrogating the first switch, wherein the first switch specific configuration syntax and allowable settings values are specific to a particular hardware and operating system combination of the first switch;
- receive, within a network device configuration editor having a superset of configuration syntax and allowable settings values, syntax and settings values for defining a first configuration for the first switch in the target network, wherein the superset comprises configuration syntax and allowable settings values for a plurality of hardware and operating system combinations;
- limit the superset to the first switch specific configuration syntax and allowable settings values for the first switch to create a limited superset, wherein the limited superset comprises configuration syntax and allowable settings values that are specific to the particular hardware and operating system combination of the first switch;
- compare the limited superset to the received syntax and settings values for defining the first configuration for the first switch; and
- indicate syntax errors and settings value errors in the received syntax and settings values for defining the first configuration for the first switch.

19. The non-transitory, computer-readable medium of claim 18, wherein the computer-executable instructions further cause the computer to provide suggested replacement syntax for correcting the indicated syntax errors and replacement allowable settings values for correcting the indicated settings value errors.

20. The non-transitory, computer-readable medium of claim 18, wherein the computer-executable instructions further cause the computer to update the syntax and the settings values for defining the first configuration for the first switch based on inputs received from a user.

* * * * *